Dec. 3, 1963   B. BEDERSON ETAL   3,113,207
PARTICLE SEPARATION APPARATUS UTILIZING CONGRUENT
INHOMOGENEOUS MAGNETOSTATIC
AND ELECTROSTATIC FIELDS
Filed March 1, 1960
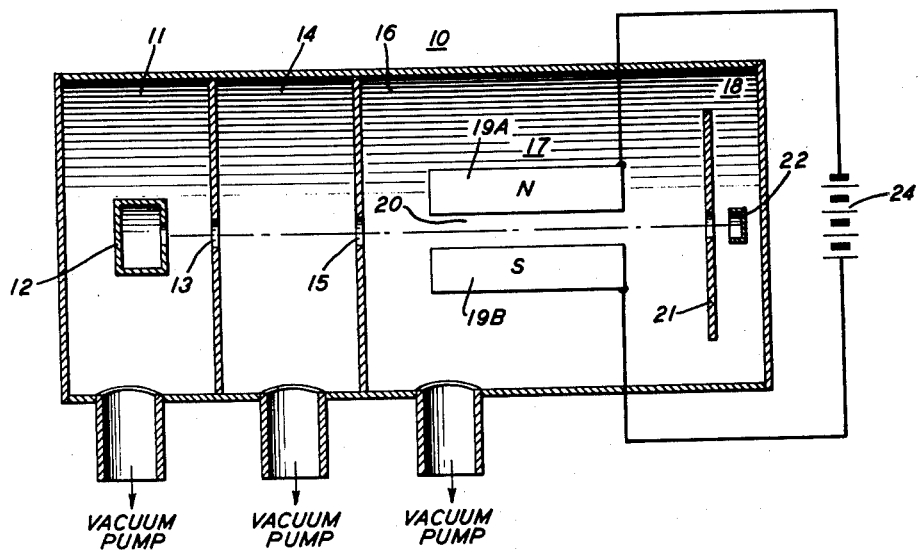
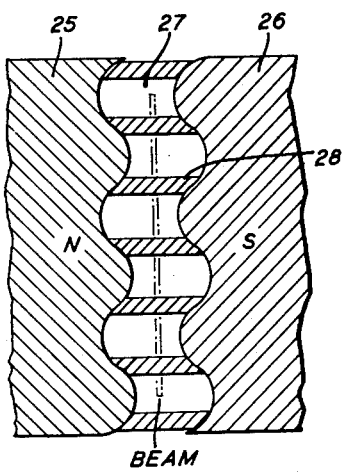
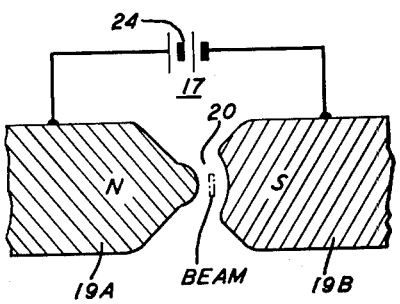
INVENTORS B. BEDERSON
J. EISINGER
K. RUBIN
BY
ATTORNEY United States Patent Office 3,113,207
Patented Dec. 3, 1963

3,113,207
PARTICLE SEPARATION APPARATUS UTILIZING CONGRUENT INHOMOGENEOUS MAGNETOSTATIC AND ELECTROSTATIC FIELDS
Benjamin Bederson, Larchmont, N.Y., Joseph Eisinger, Berkeley Heights, N.J., and Kenneth Rubin, Ardsley, N.Y.; said Eisinger assignor to Bell Telephone Laboratories, Incorporated, New York, N.Y., a corporation of New York
Filed Mar. 1, 1960, Ser. No. 12,217
2 Claims. (Cl. 250—41.9)

This invention relates to apparatus for selecting from a beam of particles those of a particular magnetic substate.

It is well known that if a beam of particles is passed through an inhomogeneous magnetic field which provides a magnetic field gradient individual particles suffer a deflection which is directly related to their effective magnetic moment in the field. This principle has in the past been used as the basis for separating from a beam of particles those of a particular magnetic substate since particles of different magnetic substates have different effective magnetic moments. Apparatus for such separation has been important in the study of the properties of atomic and molecular particles.

One of the problems of apparatus of this kind, which employs magnetic deflection, is that the amount of deflection a particular particle undergoes is also related to its velocity since its velocity determines how long a particle spends in the deflecting field. As a consequence, if the beam which is passed through the deflecting field includes a distribution of velocities, as is typically the case, the parent beam will not be divided into a series of discrete beams but rather will experience simply a multipeaked distribution deflection pattern. As a further consequence, it becomes just about impossible to achieve high efficiency in the collection of particles of particular magnetic substates.

An object of the invention is to minimize the effect of the distribution of particle velocities in the separation and collection of particles of a particular magnetic substate.

By minimizing velocity effects, there is improved the efficiency of separation from the beam of particles of a particular magnetic substate and, accordingly, there is made possible collection of a beam of increased density of particles of a given magnetic substate.

A feature of the invention is a deflection system which utilizes congruent inhomogeneous magnetic and electric fields. In particular, in such a deflection system it is possible to adjust the magnetic and electric deflection forces so that they are balanced for particles of a given magnetic substate but unbalanced for particles of different magnetic substates, substantially independent of the velocities of the particles. As a consequence, by passing a beam through such a deflection system there can be deflected and thereby separated from the beam all particles of other than a given magnetic substate whereby the undeflected portion of the beam consists substantially entirely of particles of the given magnetic substate.

In accordance with an illustrative embodiment of the invention, a suitable source provides a beam of particles which is passed through a gap between two pole pieces whose faces are appropriately shaped to provide a suitable inhomogeneous magnetic field in the gap where the beam passes. Additionally, an appropriate D.-C. voltage difference is maintained between the two pole pieces to superpose in the gap a congruent inhomogeneous electric field over the inhomogeneous magnetic field.

The invention will be better understood from the following more detailed description, taken in conjunction with the accompanying drawing, in which:

FIG. 1 shows partly diagrammatically a top view with the top of the enclosure removed of apparatus in accordance with the invention;

FIG. 2 shows partly diagrammatically a front view of a transverse section through the deflection system of the apparatus shown in FIG. 1; and FIG. 3 shows a transverse section of an alternative form of deflection system suitable for use in the apparatus shown in FIG. 1.

With reference now to the drawing, the apparatus shown in FIG. 1 comprises an enclosure 10 which is compartmentalized into a series of sections each of which is kept evacuated to an appropriate pressure by vacuum pumping in the manner known to workers in the art. More particularly, the enclosure includes an oven chamber 11 within which is included the source 12 within which in turn is the material whose vapor effuses into the oven chamber out through the aperture in the source. By way of the aperture 13 in the oven chamber, the particles pass into the collimating chamber 14. By way of the aperture 15 in the collimating chamber, the particles move into the deflection chamber 16. The particles are collimated into a beam by passing through the various apertures as known to workers in the art. The deflection chamber includes the deflection system 17 and the target assembly 18.

The deflection system 17, as seen more clearly from FIG. 2, includes a pair of magnet pole pieces 19A, 19B spaced to define a gap 20 through which the beam flows. The faces of pole pieces 19A and 19B are shaped to provide an inhomogeneous magnetic field in the gap 20. As shown, the face of pole piece 19A is tapered over most of its surface, but the vertex portion of the taper is rounded. The face of pole piece 19B is also tapered, but the vertex portion is cut away to provide a concave portion which is substantially concentric with the rounded portion of the face of pole piece 19A. The pole pieces are disposed such that the path of flow of the undeflected particles extends along the region of the gap defined by the curved portions of the pole faces as shown.

The target assembly 18 includes an apertured plate 21 and a collector 22. The collector is aligned with the aperture in plate 21, and apertures 13 and 15 and accordingly is in position to collect particles of the beam which experience insignificant deflection in their traversal of gap 20. Alternatively, particles which do experience deflection are collected by the plate 21.

Additionally, in accordance with an important feature of the present invention, there is provided a voltage source 24 which is connected between pole pieces 19A and 19B in order to maintain a voltage difference therebetween and thereby to create an electrostatic field in the gap 20 which is congruent with the magnetostatic field created there by the pole pieces 19A and 19B.

The magnitude of the applied voltage is adjusted so that the deflection force provided by the electric field balances the deflection force provided by the magnetic field on particles of a particular effective magnetic moment. Since the magnetic deflection force on a particle is related to the product of the gradient of the magnetic field and the effective magnetic moment of the particle, the magnetic deflection force will be different for particles of different magnetic substates. However, since the electric deflection force on a particle is related to the product of the gradient of the electric field and the effective electric dipole moment of the particle but independent of its effective magnetic moment, the electric deflection force will be the same for all particles so long as their electric dipole moments are similar. As a consequence, because the electric and magnetic fields are congruent and accordingly their gradients related, the condition for balance of an atom of a particular atomic species will in general be different for different magnetic substates of the species.

Accordingly, the apparatus described will serve to deflect selectively particles of other than the particular magnetic substate to which the balance conditions apply when all the particles have substantially the same electric dipole moment. The electric dipole moment referred to is generally the induced electric dipole moment which the atom possesses by virtue of its polarizibility and the electric field in which it finds itself.

In one specific application of the invention rubidium 87 atoms of the $m_F=+1$, $F=2$ magnetic substate were separated from the remaining atoms and collected by passing them through the portion of a gap in which the magnetic field was 2051 gauss and the electric field was 130,765 volts per centimeter. In such applications the gap was designed to have a magnetic field gradient described by $2.5 \times H$ gauss per centimeter, where H is the value of the magnetic field. The field H ranged over the region of 0 to 10,000 gauss. The electric field gradient is described by the similar relation $2.5 \times E$ volts/centimeter$^2$, where E is the value of the electric field. The field E ranged over the region 0 to 150,000 volts per centimeter.

It should be obvious that the principles of the invention are applicable equally to beams of atoms and beams of molecules and, as is the practice in the art, the term "molecular beam" will be used in the claims in a generic sense to encompass both beams of atoms and beams of molecules.

It should be apparent further that the principles of the invention are independent of the particular manner of formation of the beam. In particular, the source may be supplied with vapor from an external supply, as would be the case where the apparatus is designed for continuous isotopic separation of a stream of particles on the basis that a particular isotope will have a characteristic effective magnetic moment.

Similarly, the collector assembly can take a variety of forms dependent on the use intended for the separated particles. For example, the separated particles may be used to provide radiation of radio frequency energy in accordance with known maser principles. In such an application, the apparatus described is used to separate the particles in the lower of two magnetic substates. The remaining particles are then passed into a cavity resonant at the frequency which corresponds to the transition frequency associated with the two magnetic substates, whereby the cavity is excited as Boltzmann equilibrium between the two magnetic substates is reestablished.

Moreover, the shape of the inhomogeneous electric and magnetic fields in the deflection gap, and hence the shape of the faces of the pole pieces can take a wide variety of forms consistent with the principles of the invention. For example, FIG. 3 illustrates one form especially advantageous when a beam of wide cross section is employed. In this case, each of the two faces 25, 26 is scalloped and the depressions in one face are opposite the rises in the other face whereby the gap 27 has a substantially uniform width. Beam stops 28 are utilized to restrict the beam only to those portions of the gap where the electric and magnetic fields are suitable.

Moreover, when the angular momentum is other than zero, the apparatus can be used to separate particles of different nuclear magnetic substates by working in the low field region where different $M_I$ states differ by fractions of a Bohr magneton. Such apparatus is useful in producing polarized ion beams for accelerators.

What is claimed is:

1. Apparatus for separating from a molecular beam particles of a particular magnetic substate comprising a deflection system including means for establishing congruent inhomogeneous magnetostatic and electrostatic fields along the path of said beam, the strengths of the two fields being such that particles of the particular magnetic substate pass substantially undeflected through said fields while other particles are deflected.

2. In combination, a source of a molecular beam, a collector in target relation with said source, and a deflection system selectively passing for travel to said collector particles of a particular magnetic substate, said system comprising a pair of pole pieces defining a gap through which the beam flows, the faces of said pole pieces being shaped to form an inhomogeneous magnetic field in said gap, and means for maintaining a voltage difference between said pole pieces for forming a congruent electric field in said gap, the strengths of the two fields being such as to pass undeflected particles of the particular magnetic substate and to deflect particles of different magnetic substates.

References Cited in the file of this patent

UNITED STATES PATENTS

| | | |
|---|---|---|
| 2,143,579 | Ruska | Jan. 10, 1939 |
| 2,743,366 | Hershberger | Apr. 24, 1956 |
| 2,879,439 | Townes | Mar. 24, 1959 |

OTHER REFERENCES

Atomic Physics (Physics Staff, University of Pittsburgh), The Stern and Gerlach Experiment on Atomic Magnetic Moments, pages 184–185, New York, John Wiley & Sons, Inc., London, Chapman & Hall, Limited, 1937.